United States Patent [19]
Miller et al.

[11] Patent Number: 5,111,840
[45] Date of Patent: May 12, 1992

[54] MODULAR VALVE

[75] Inventors: Douglas P. Miller, New Berlin; Edward T. Arters; Ronald J. Morgenson, both of Milwaukee, Wis.

[73] Assignee: Applied Power Inc., Butler, Wis.

[21] Appl. No.: 669,121

[22] Filed: Mar. 14, 1991

[51] Int. Cl.$^5$ .............................................. F16K 11/02
[52] U.S. Cl. .................................. 137/270; 137/625.65; 137/625.25
[58] Field of Search ............. 137/270, 625.65, 625.25, 137/625.26

[56] References Cited

U.S. PATENT DOCUMENTS 3,270,776  9/1966  Carls ................................ 137/270 X
3,602,246  8/1971  Hettinger ......................... 137/884 X

FOREIGN PATENT DOCUMENTS 2042684  9/1980  United Kingdom ................ 137/270

OTHER PUBLICATIONS

Exhibit 1, 2-and 3-Way Leakproof Solenoid Valves, SV10-40 Series, SV400 Series, of Circle Seal Controls, Anaheim, Calif.
Exhibit 2, FAG Hochdruck-Industriehydraulik of FAG Kugelfischer Georg Schäfer KGaA, Erlangen, W. Germany.
Exhibit 3, High Pressure Programme 630, The Rexroth Corporation, Easton, Pa.
Exhibit 4, HAWE Directional Seated Valves of Heilmeier & Weinlein, Munich, W. Germany.
Exhibit 5, BMH Bieri Modular Hydraulic System of H. Bieri AG, Liebefeld, Switzerland.
Exhibit 6, Wandfluh NG 4-Mini Range of Wandfluh Ltd., Frutigen, Switzerland.
Exhibit 7, Hoerbiger Hydraulik of Hoerbiger Hydraulic GmbH, Schongau, W. Germany.

Primary Examiner—Alan Cohan
Attorney, Agent, or Firm—Quarles & Brady

[57] ABSTRACT

A modular valve has a valve housing which defines a manifold interface having a normally open port, a normally closed port and a common port. A manifold block is mounted to the valve housing with its valve interface sealed against the manifold interface. The valve interface of the manifold block has first, second and third valve ports which lead to respective first, second and third mounting ports at a mounting interface of the manifold block. The first, second and third valve ports and the normally open normally closed and common ports are arranged to communicate with one another in either of two angularly spaced positions of the valve housing relative to the manifold block. In one position, the first valve port comunicates with the normally open port, the second valve port communicates with the normally closed port, and the third valve port communicates with the common port. In the other position, the first valve port communicates with the normally closed port, the second valve port communicates with the normally open port, and the third valve port communicates with the common port.

8 Claims, 3 Drawing Sheets

MODULAR VALVE

BACKGROUND OF THE INVENTION

1. Field of the Invention

This invention relates to a valve having normally open and normally closed ports and in particular to such a valve in which the normally open port can be readily changed to normally closed and vice versa.

2. Discussion of the Prior Art

Valves which have a normally open port and a normally closed port with a common port between the normally open and normally closed ports are well known. Such valves, which are typically solenoid operated, are common and popular for pneumatic and hydraulic fluid control applications.

Such valves typically have a fixed port pattern, and especially in the case of hydraulic valves, the pattern is usually made to match a pattern of ports on a control system mounting block to which the valve is mounted. Thus, the pattern of ports on the valve is dictated by the pattern of ports on the control system mounting block. In addition, many valve manufacturers have adopted their own port patterns, which differ from the port patterns of other manufacturers. Furthermore, it is typical that a normally open port cannot be changed to a normally closed port using the same valve. Instead, a different valve having a different arrangement of internal components must be employed.

Having many different types of valves and many different port configurations has created problems in inventory control of distribution outlets for such valves and in repair and replacement of valves in existing control systems. With many different valves and many different port configurations, each particular valve has a relatively limited application and yet is still desirable to maintain in inventory. In addition, the rather unique application of any particular valve to a particular control system creates difficulties in changing the functions of ports in existing control systems, resulting in a lack of flexibility in adapting existing control systems to different functions or purposes.

SUMMARY OF THE INVENTION

The invention provides a modular valve which overcomes the above disadvantages. A valve housing for a modular valve of the invention has a manifold interface and a manifold block has a valve interface and a mounting interface. Means are provided for mounting the valve housing to the manifold block with the manifold interface adjacent to the valve interface in either of a first position or a second position of the valve housing relative to the manifold block. The valve housing defines first, second and third manifold ports that open to the manifold interface and means are provided for providing communication between the first and third manifold ports in a first state of the valve and between the second and third manifold ports in a second state of the valve. The manifold block has first, second and third passageways which open respectively in the valve interface at first, second and third valve ports and open respectively in the mounting interface in first, second and third mounting ports. The manifold ports and valve ports are arranged to provide communication between the first manifold and valve ports, between the second manifold and valve ports, and between the third manifold and valve ports in the first position of the valve housing relative to the manifold block. In the second position of the valve housing relative to the manifold block, the arrangement of the manifold ports and valve ports provides communication between the first manifold port and the second valve port, between the second manifold port and the first valve port, and between the third manifold port and the third valve port. Thereby, whether the first and second mounting ports function as normally open or normally closed can be changed simply by assembling the valve housing to the manifold block in either the first position or the second.

In addition, the port pattern at the valve interface of the manifold block can be standardized to match the port pattern of the manifold interface of the valve housing in the first and second positions. The port pattern at the mounting interface of the manifold block can, on the otherhand, be made to any desired specification, for example to match existing port patterns to facilitate valve replacements. Thus, only different manifold blocks need be maintained in inventory, along with a supply of valve housings which can be used with any of the manifold blocks.

In an especially useful form, the third passageway of the manifold block has at least two third valve ports opening in the valve interface. At least one of the third valve ports is in registration with the third manifold port in each of the first and second positions of the valve housing relative to the manifold block. The other third valve port is plugged by means provided on the manifold interface of the valve housing. Thereby, the same common passageway in the valve housing can be used in both of the first and second positions of the valve housing relative to the manifold block.

In another useful aspect, the manifold block is arranged at one end of the valve housing and an actuator is arranged at an opposite end. The two positions of the valve housing relative to the manifold block are spaced apart angularly so that the valve housing can be shuttled between the two positions by turning it relative to the valve housing. Thereby, the valve creates a minimal "footprint" on a mounting block to which the valve is affixed to further increase the valve's ability to be adapted to different applications.

DETAILED DESCRIPTION OF THE PREFERRED EMBODIMENTS

Figure 1:
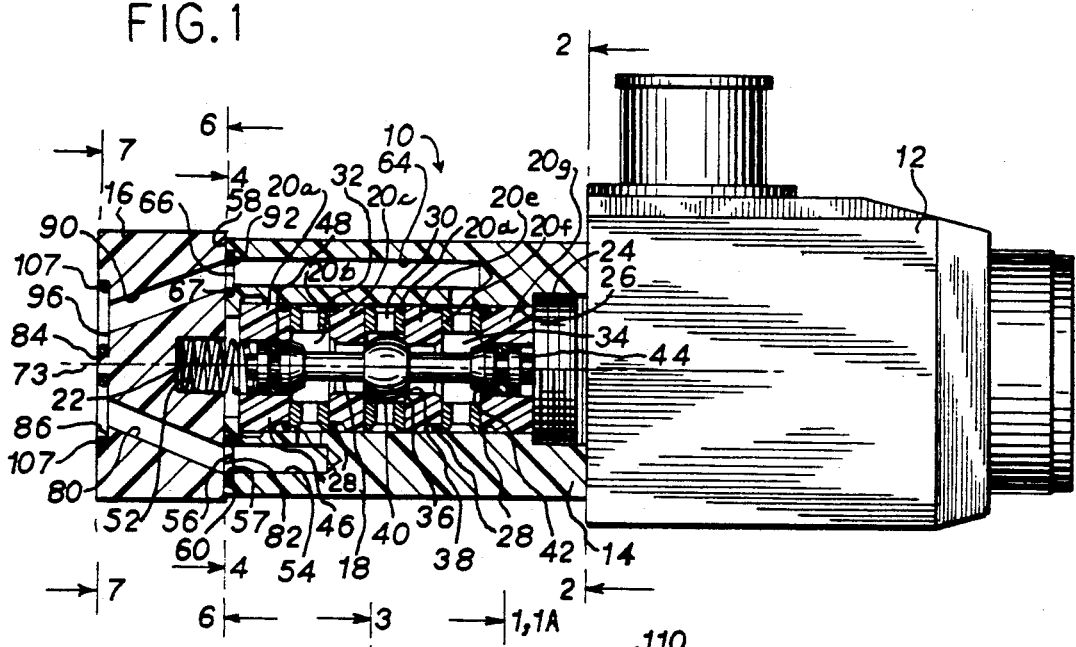
FIG. 1 is a sectional view of a modular valve of the invention in which a valve housing of the valve is shown in section as viewed from the plane of the line 1—1 of FIG. 2 and in which a manifold block of the valve is shown in section as viewed from the plane of the line 1A—1A of FIG. 2.

FIG. 1 illustrates a modular valve 10 of the invention having a solenoid actuator 12, a valve housing 14, a manifold block 16, a poppet 18, valve inserts 20a-g and a return compression spring 22. The solenoid actuator 12 is a conventional electrically operated solenoid which is screwed into bore 24 at actuator interface 25 of valve housing 14. The poppet 18 extends rightwardly into abutment with a solenoid actuator pin (not shown) inside the actuator 12 which is forced leftwardly when the actuator 12 is energized. Spring 22 acts against the leftward end of the poppet 18 and is seated in a recess 52 in the manifold block 16.

Figure 2:
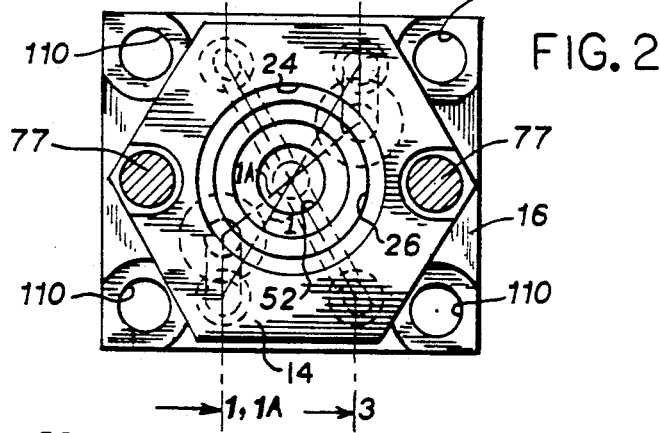
FIG. 2 is an end elevation view of a valve housing and manifold block for the modular valve of FIG. 1 as viewed from the plane of the line 2—2 of FIG. 1.
Figure 4:
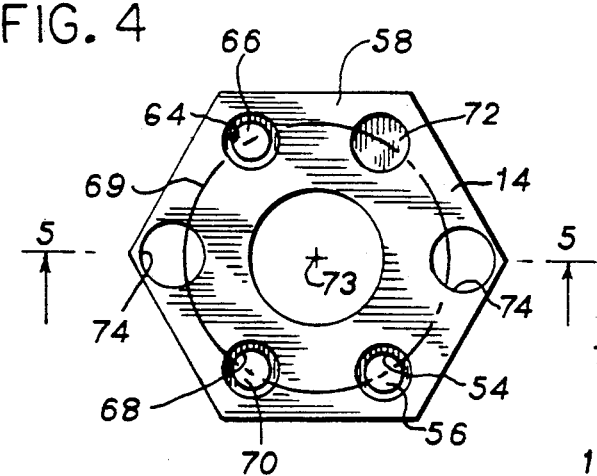
FIG. 4 is an end elevation view of a valve housing for the modular valve of FIG. 1 as viewed from the plane of the line 4—4 of FIG. 1.

The valve housing 14 has a hexagonal outer shape and a central cylindrical bore 26 (FIGS. 2 and 4). Inside the bore 26, annular valve inserts 20a-g are stacked next to one another and held in place by the actuator 12. Appropriate seals 28 are provided between the valve inserts 20a-g and the bore 26 to prevent leakage between the valve inserts 20a-g and the housing 14. The poppet 18 is assembled within the inserts 20a-g with its ball 36 between inserts 20c and 20e to define a common chamber 30, a normally open chamber 32, and a normally closed chamber 34 within the valve housing 14. Inserts 20b, 20d and 20f have radial passageways spaced about their circumference to provide fluid communication from their inner diameter to their outer diameter.

When the solenoid 12 is not energized, which may be the "normal" state of the valve 10, spring 22 urges ball 36 to seat against seat 38 of insert 20e thereby normally closing off communication between chamber 34 and chamber 30 and normally providing communication between chamber 32 and chamber 30. When solenoid 12 is energized, the solenoid actuator pin (not shown) is electro-magnetically repelled axially away from the solenoid 12 in well known fashion to shift the poppet 18 leftwardly as viewed in FIG. 1, which compresses return spring 22 and seats ball 36 of poppet 18 against seat 40 of insert 20c. In this position, communication between normally open chamber 32 and common chamber 30 is closed off and communication is provided between common chamber 30 and normally closed chamber 34.

So much of the valve 10 as has been described in detail thus far is known in the art as a balanced poppet valve. It is balanced because fluid introduced to chamber 34 or to chamber 32 produces two equal and opposite forces on the poppet 18 which balance one another so that the poppet 18 may be moved axially by the solenoid 12 or spring 22 relatively easily. Briefly, when fluid under pressure is introduced to chamber 34, it acts on ball 36 and on face 42, which have the same area exposed to the fluid, to produce equal and opposite forces. Leakage past face 42 is prevented by sliding seal 44. Pressure forces acting in chamber 32 are balanced by pressurized fluid acting on ball 36 and face 46 of poppet 18 to produce equal forces in opposite directions on the poppet 18. Leakage past face 46 is prevented by sliding seal 48.

Referring to FIGS. 1 and 4, a normally open passageway 54 is in communication with normally open chamber 32 and opens at a normally open port 56 in manifold interface surface 58 of valve housing 14. Normally open port 56 is counterbored so as to receive an O-ring seal 57 in the counterbore to provide a seal against valve interface surface 60 of manifold block 16.

The valve housing 14 also has a normally closed passageway 64 which is in communication with normally closed chamber 34 and opens in manifold interface surface 58 in a normally closed port 66. Port 66 is also counterbored to receive an O-ring seal 67 in the counterbore recess to provide a seal against valve interface surface 60 of manifold block 16.

Figure 3:
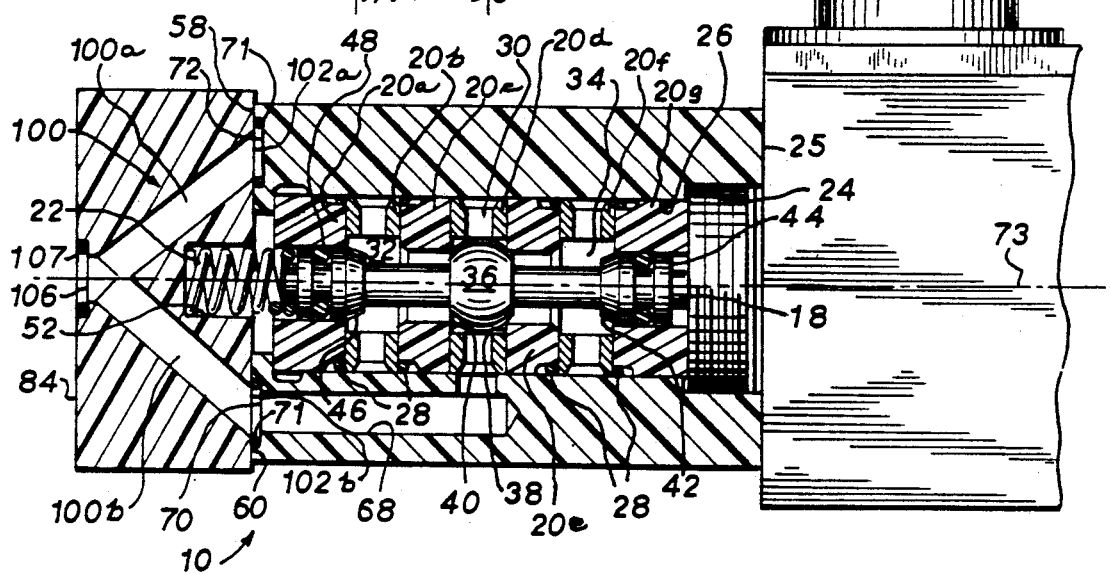
FIG. 3 is a view Similar to FIG. 1 but with the valve housing and manifold block shown in section as viewed from the plane of the line 3—3 of FIG. 2.

As best shown in FIGS. 3 and 4, a common passageway 68 in the valve housing 14 communicates with common chamber 30 and opens in manifold interface surface 58 of valve housing 14 in a common port 70. Common port 70 is also counterbored to form a recess to receive an O-ring seal 71 for sealing against valve interface surface 60 of manifold block 16.

The manifold interface 58 of valve housing 14 is also provided with a closed port 72 which is a blind recess to receive an O-ring seal 71 to seal against the valve interface surface 60 of the manifold block 16. The closed port 72 is positioned opposite from the common port 70 on a circle 69 (FIG. 4) which is centered at the longitudinal axis 73 of the housing 14 and on which lies the center of the common port 70. The closed port 72 is therefore spaced approximately the same radial distance from the longitudinal axis 73 of the housing 14 as the common port 70 and angularly spaced approximately 180° from the common port 70. The ports 56 and 66 are also centered on the circle 69 in the preferred embodiment and spaced approximately 180° from each other and approximately 60° from the respective ports 70 and 72.

As best shown in FIGS. 2, 4, 5 and 8, opposed bores 74 are provided in the valve housing 14 and threaded bores 76 are provided in the manifold block 16 which are in registration with the bores 74 so that the valve housing 14 and manifold block 16 can be secured to one another with appropriate screws 77 (FIG. 2) extending through the bores 74 and threaded into the bores 76. Bores 74 are counterbored at 75 for the heads of the screws 77 to fit into the recesses of the counterbores 75 and lay below the rightward end surface of the actuator interface 25 of the valve housing 14 as shown in FIG. 1. Since the bores 74 and 76 are symmetrically arranged, they can be used to mount the valve housing 14 to the manifold block 16 in either of two positions which are approximately 180° apart.

Figure 6:
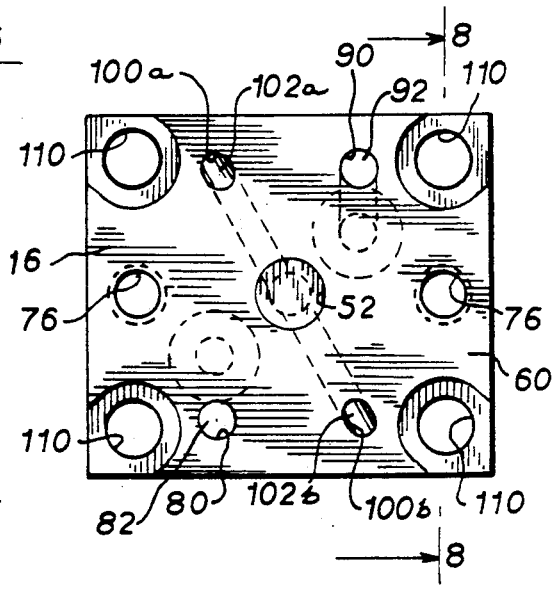
FIG. 6 is an end elevation view of a manifold block for the modular valve of FIG. 1 taken along the plane of the line 6—6 of FIG. 1.
Figure 5:
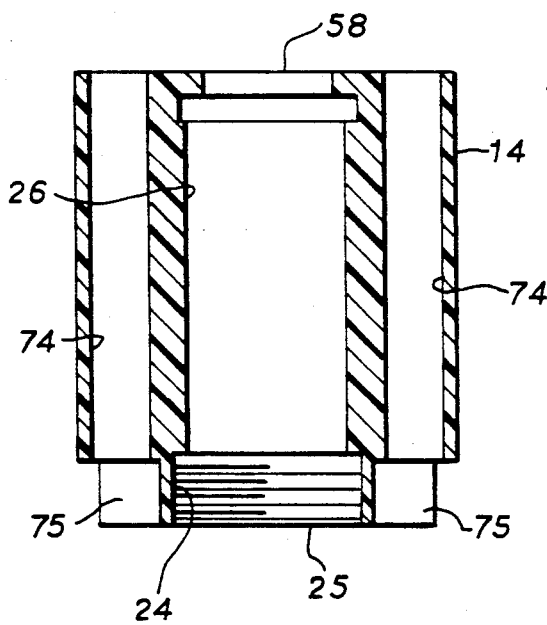
FIG. 5 is a sectional view of the valve housing of FIG. 4 taken along the plane of the line 5—5 of FIG. 4.
Figure 7:
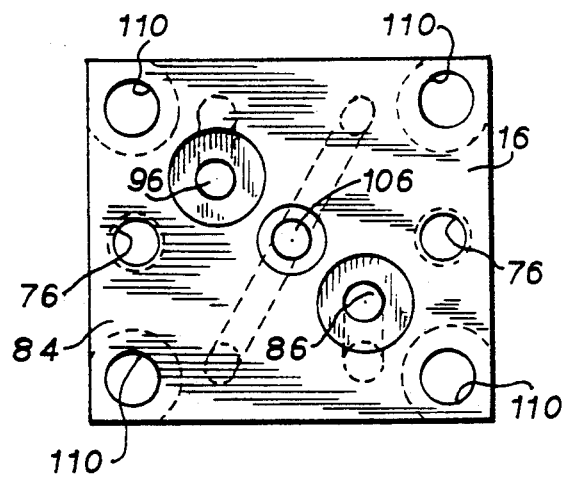
FIG. 7 is an end elevation view of a manifold block for the modular valve of FIG. 1 taken along the plane of the line 7—7 of FIG. 1.
Figure 8:
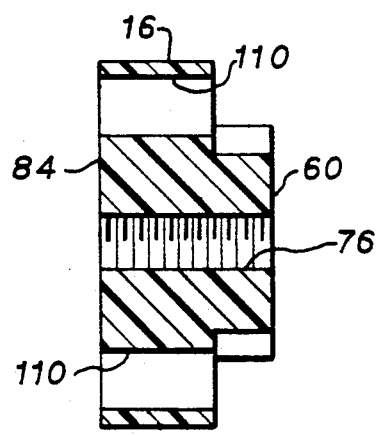
FIG. 8 is a sectional view of a manifold block for the modular valve of FIG. 1 taken along the plane of the line 8—8 of FIG. 6.

As best shown in FIGS. 1 and 6, the manifold block 16 has a first passage 80 which opens at the valve interface surface 60 of manifold block 16 in a first valve port 82 and opens at mounting interface 84 of manifold block 16 in a first mounting port 86. The manifold block 16 also has a second passage 90 which opens at valve interface 60 of manifold block 16 at a second valve port 92 and opens at the mounting interface 84 in a second mounting port 96. The valve ports 82 and 92 are angularly opposed from one another at approximately 180° and are equally spaced from longitudinal axis 73, to match the positions of ports 56 and 66 in either of two positions of the valve housing 14 relative to the manifold block 16.

As best shown in FIGS. 3 and 6, a common passageway 100 includes two legs 100a and 100b, each of which opens at valve interface surface 60 of manifold block 16 at third valve ports 102a and 102b which are angularly opposed at approximately 180° from one another and equally spaced from longitudinal axis 73 so that the ports 102a and 102b register with the ports 70 and 72 in the two positions of the valve housing 14 relative to the manifold block 16 in which the ports 82 and 92 register with the ports 56 and 66.

Legs 100a and 100b of passageway 100 come together toward the mounting interface 84 of manifold block 16 to form third mounting port 106 which opens in the mounting interface 84. All of the ports 86, 96, and 106 are counterbored so as to receive sealing elements such as O-rings 107 in the recesses of the counterbores to form a seal against the mounting block to which valve 10 is to be mounted. Counterbored mounting holes 110 can be provided in the manifold block 16 (see FIGS. 2, 6, 7 and 8) to allow bolting the valve 10 to a mounting block (not shown).

Figure 9:
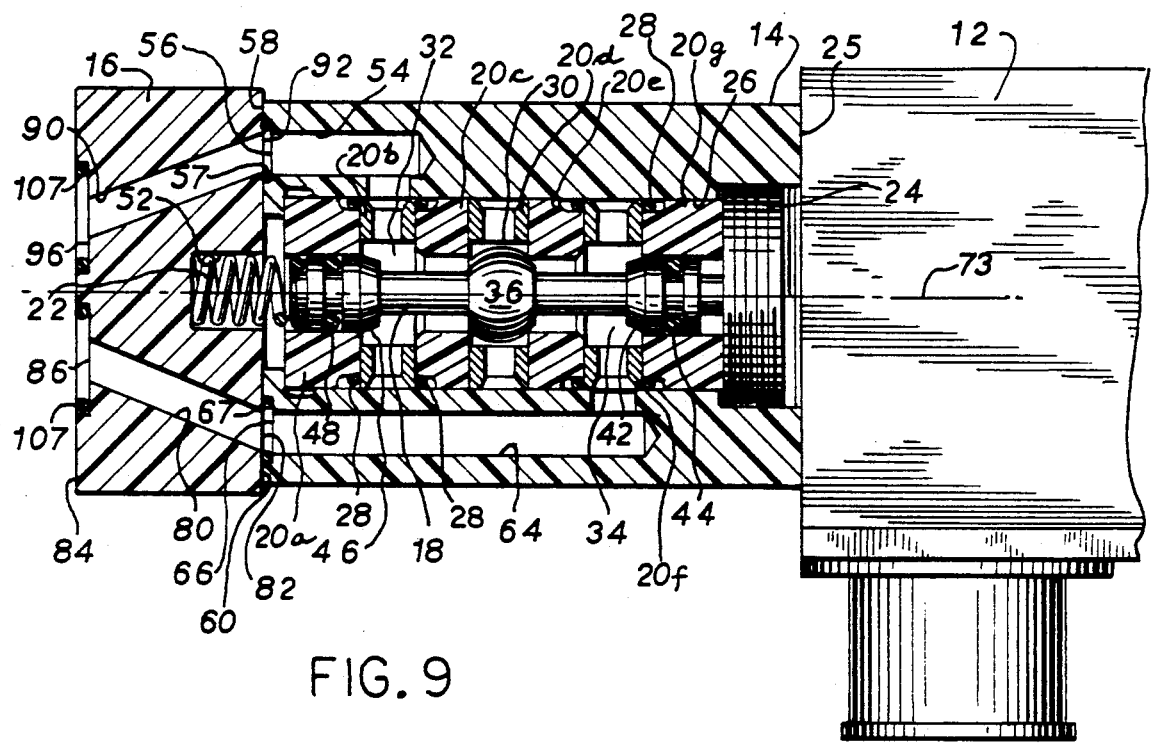
FIG. 9 is a view similar to FIG. 1 but showing the functions of the ports of the manifold block reversed.
Figure 10:
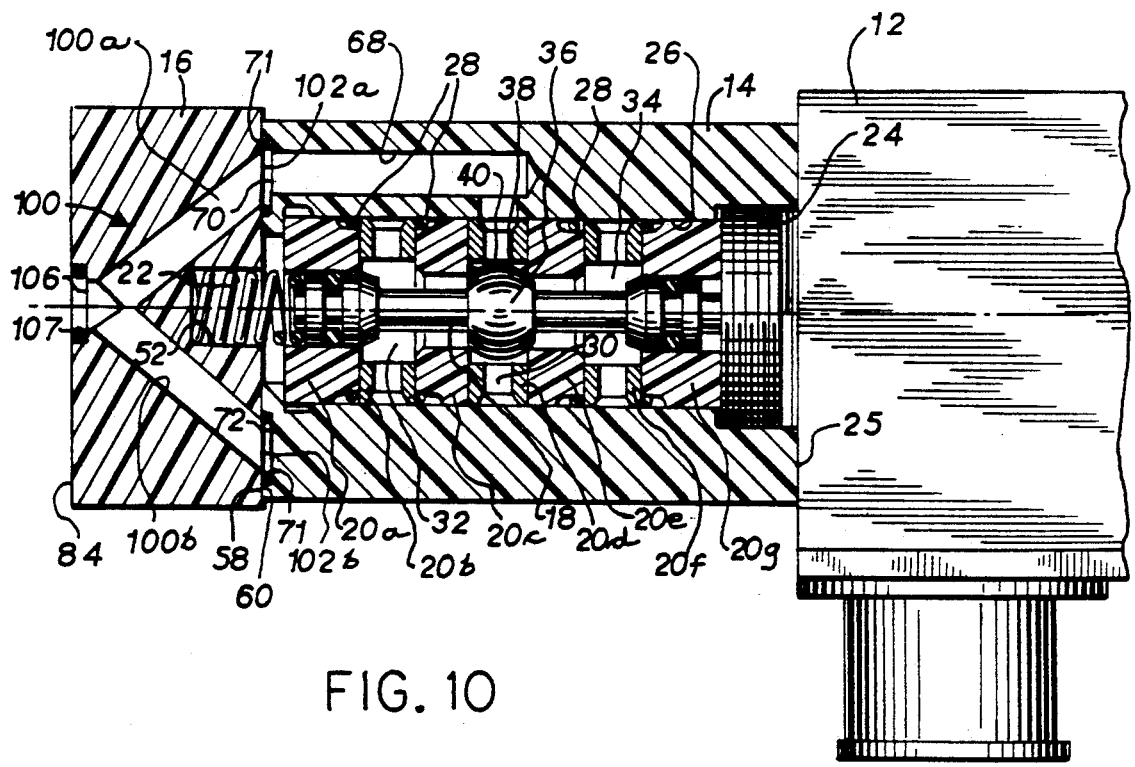
FIG. 10 is a view similar to FIG. 3 but showing the valve in the reversed configuration of FIG. 9.

In the position of the valve housing 14 relative to the manifold block 16 shown in FIGS. 1 and 3, the first mounting port 86 is in communication with the normally open chamber 32 via first passageway 80, first valve port 82, normally open port 56, and normally open passageway 54. In this position, the second mounting port 96 is in communication with the normally closed chamber 34, via second passageway 90, second valve port 92, normally closed port 66 and normally closed passageway 64. In addition, this position of the valve housing 14 relative to the manifold block 16 places the third mounting port 106 in communication with common chamber 30 via third passageway 100 through branch 100b, third valve interface port 102b, common port 70 and common passageway 68. In this position, the closed port 72 seals off third valve interface port 102a. Thus, in this position of the valve housing 14 relative to the manifold block 16, the first mounting port 86 is normally open, the second mounting port is normally closed and the third mounting port 106 is common. Referring now to FIGS. 9 and 10, the valve 10 is shown with the valve housing 14 assembled to the manifold block 16 rotated 180° about axis 73 relative to the assembly position shown in FIGS. 1 and 3. In the position shown in FIGS. 9 and 10, the first mounting port 86 is in communication with the normally closed chamber 34 via first passageway 80, first valve port 82, normally closed port 66 and normally closed passageway 64, and the second mounting port 96 is in communication with the normally open chamber 32 via second passageway 90, second valve port 92, normally open port 56 and normally open passageway 54. In addition, this position of the valve housing 14 relative to the manifold block 16 places the third mounting port 106 in communication with common chamber 30 via third passageway 100 through branch 100a, third valve interface port 102a, common port 70 and common passageway 68. In this position, the closed port 72 seals off third valve interface port 102b. Thus, in this position of the valve housing 14 relative to the manifold block 16, the first mounting port 86 is normally closed, the second mounting port 96 is normally open and the third mounting port 106 is common.

Thus, there has been described a valve in which the normally open or normally closed functions of mounting ports can be switched by selectively assembling a valve housing to a manifold block in which the mounting ports are formed in either of two positions. Moreover, the mounting ports formed at the mounting face of the manifold block can be arranged in any desired pattern to facilitate replacement of valves having many different port patterns and reduce the inventory of different valves which must be maintained on hand.

Many modifications and variations to the preferred embodiment will be apparent to those of ordinary skill in the art but which will still be within the spirit and scope of the invention. For example, rather than providing a branched connection for the third passageway 100 in manifold block 16, a single branch could be provided and two common passages could be provided in the valve housing 14, one of which would be in communication with the third passageway in the manifold block 16 in either assembly position of the valve housing 14 relative to the manifold block 16. With this configuration, a closed port could be provided on the manifold block to seal off the common passageway of the valve housing which was not in direct communication with the third passageway in the manifold block. Moreover, the invention could be adapted to basic valve constructions other than balanced poppet type valves. For example, the invention could be adapted to spool or ball type valves. Therefore, the invention should not be limited to the scope of the preferred embodiments described, but only by the claims that follow.

We claim:

1. A modular valve, comprising:
a valve housing having a manifold interface;
a manifold block having a valve interface and a mounting interface;
means for mounting said valve housing to said manifold block with said manifold interface adjacent to said valve interface in either of a first position or a second position of the valve housing relative to the manifold block;
a first manifold port in said valve housing, said first manifold port opening to said manifold interface;
a second manifold port in said valve housing, said second manifold port opening to said manifold interface;
a third manifold port in said valve housing, said third manifold port opening to said manifold interface;
means for providing communication between said first and third manifold ports in a first state of said valve;
means for providing communication between said second and third manifold ports in a second state of said valve;
a first passageway in said manifold block opening at a first valve port in said valve interface and at a first mounting port in said mounting interface to provide fluid communication between said first valve port and said first mounting port;
a second passageway in said manifold block opening at a second valve port in said valve interface and at a second mounting port in said mounting interface to provide fluid communication between said second valve port and said second mounting port;
a third passageway in said manifold block opening at a third valve port in said valve interface and at a third mounting port in said mounting interface to provide fluid communication between said third valve port and said third mounting port;
wherein said manifold ports and said valve ports are arranged to provide fluid communication: (a) between said first manifold port and said first valve port, between said second manifold port and said second valve port, and between said third manifold port and said third valve port in said first position of said valve housing relative to said manifold block or (b) between said first manifold port and said second valve port, between said second manifold port and said first valve port, and between said third manifold port and said third valve port in said second position of said valve housing relative to said manifold block; and wherein said third passageway has at least two third valve ports opening in said valve interface and at least one of said third valve ports is in registration with said third manifold port in each of the first and second positions of the valve housing relative to the manifold block.

2. A modular valve as in claim 1, wherein the first, second and third mounting ports are arranged to match a predetermined pattern of ports which differs from the pattern of the first, second and third valve ports.

3. A modular valve as in claim 1, further comprising means on said manifold interface for plugging one of said third valve ports.

4. A modular valve as in claim 1, wherein said first manifold port is normally open to communication with said third manifold port and said second manifold port is normally closed to communication with said third manifold port.

5. A modular valve as in claim 1, wherein said valve housing has an actuator interface at an end opposite from the manifold interface and further comprising a solenoid actuator mounted at said actuator interface.

6. A modular valve as in claim 1, wherein the first and second positions of the valve housing relative to the manifold block are angularly spaced apart about a common longitudinal axis.

7. A modular valve as in claim 6, wherein the angular spacing between the first and second positions of the valve housing relative to the manifold block is approximately 180°.

8. A modular valve, comprising:
a valve housing having a manifold interface;
a manifold block having a valve interface and a mounting interface;
means for mounting said valve housing to said manifold block with said manifold interface adjacent to said valve interface in either of a first position or a second position of the valve housing relative to the manifold block, said first and second positions of the valve housing relative to the manifold block being angularly spaced apart about a common longitudinal axis by approximately 180°;
a first manifold port in said valve housing, said first manifold port opening to said manifold interface;
a second manifold port in said valve housing, said second manifold port opening to said manifold interface;
a third manifold port in said valve housing, said third manifold port opening to said manifold interface;
means for providing communication between said first and third manifold ports in a first state of said valve;
means for providing communication between said second and third manifold ports in a second state of said valve;
a first passageway in said manifold block opening at a first valve port in said valve interface and at a first mounting port in said mounting interface to provide fluid communication between said first valve port and said first mounting port;
a second passageway in said manifold block opening at a second valve port in said valve interface and at a second mounting port in said mounting interface to provide fluid communication between said second valve port and said second mounting port;
a third passageway in said manifold block opening at a third valve port in said valve interface and at a third mounting port in said mounting interface to provide fluid communication between said third valve port and said third mounting port;
wherein said manifold ports and said valve ports are arranged to provide fluid communication: (a) between said first manifold port and said first valve port, between said second manifold port and said second valve port, and between said third manifold port and said third valve port in said first position of said valve housing relative to said manifold block or (b) between said first manifold port and said second valve port, between said second manifold port and said first valve port, and between said third manifold port and said third valve port in said second position of said valve housing relative to said manifold block; and
wherein said third passageway has at least two third valve ports opening in said valve interface which are angularly spaced apart by approximately 180° and the third manifold port in the valve housing communicates with one of said third valve ports in the first position of the valve housing relative to the manifold block and with the other of said third valve ports in the second position of the valve housing relative to the manifold block.

* * * * *